June 26, 1962   B. M. LAYNE   3,041,095
ADAPTER FOR DEGREE PLATE AND CHUCK AND METHOD OF USE
Filed March 5, 1958   3 Sheets-Sheet 1

INVENTOR.
BERT M. LAYNE
BY
*J. Warren Kinney Jr.*
ATTORNEY

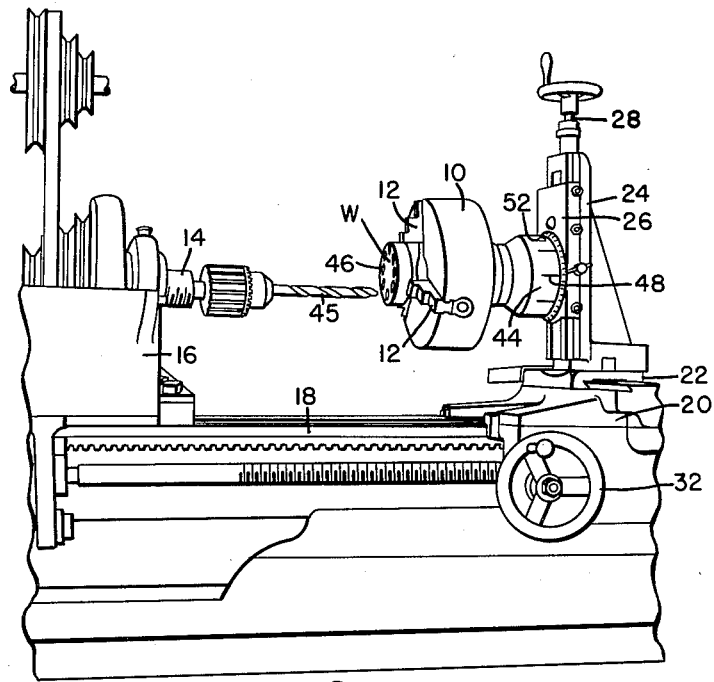

June 26, 1962  B. M. LAYNE  3,041,095
ADAPTER FOR DEGREE PLATE AND CHUCK AND METHOD OF USE
Filed March 5, 1958  3 Sheets-Sheet 3
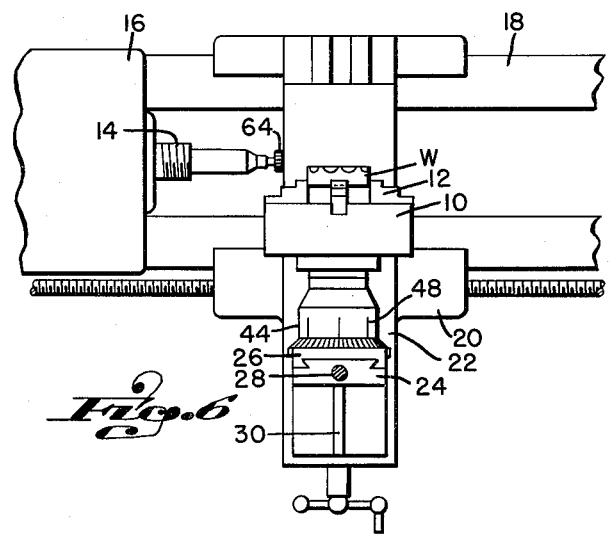
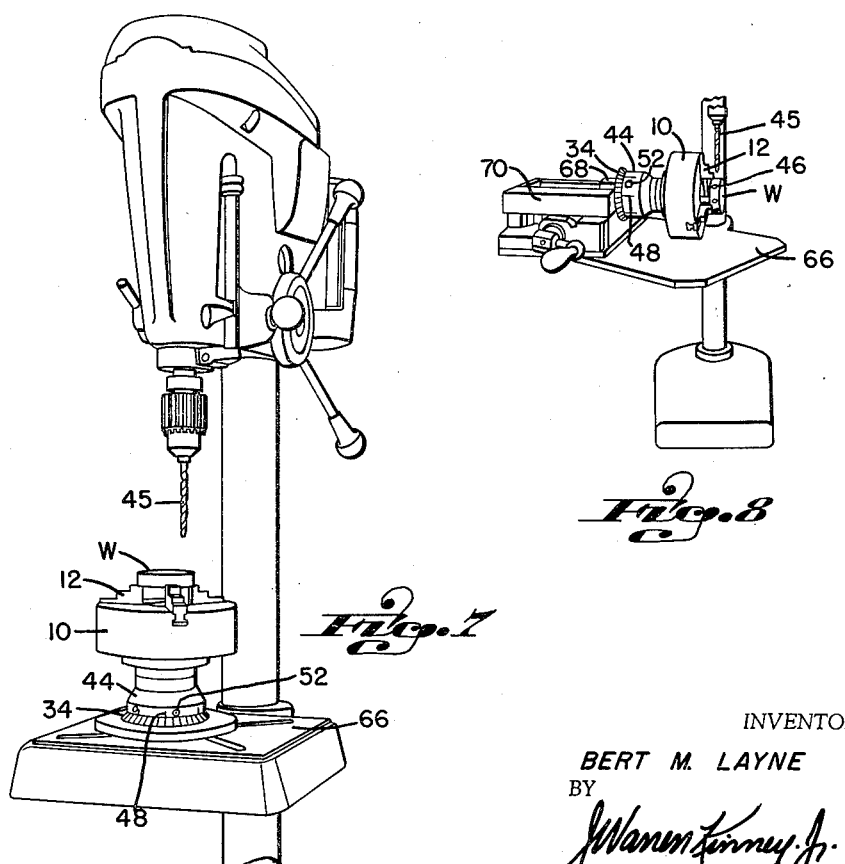
INVENTOR.
BERT M. LAYNE
BY
J. Warren Kinney Jr.
ATTORNEY 3,041,095
Patented June 26, 1962

1

3,041,095
ADAPTER FOR DEGREE PLATE AND CHUCK
AND METHOD OF USE
Bert M. Layne, 4432 Decoursey Ave., Covington, Ky.
Filed Mar. 5, 1958, Ser. No. 719,270
1 Claim. (Cl. 287—119)

This invention relates to an adapter for chucks and degree plates, and a method of machining involving the use of such adapter.

In accorance with the present invention, a workpiece that has been turned in a lathe may be expeditiously and very accurately drilled, milled, or otherwise machined further, without removing it from the lathe chuck, thereby to greatly minimize set-up time and procedure so as to effect substantial savings of time, labor, and manufacturing cost. Common practice heretofore has involved various trial and error methods of setting up a turned workpiece for drilling, milling, shaping, and other machining operations after the workpiece has been turned and removed from the lathe chuck. The known practices in this regard involved very tedious time-consuming setting up procedures wherein accuracy was frequently lost or sacrificed in the effort to maintain production schedules.

With adoption of the herein disclosed method, procedure, and apparatus, a workpiece which admits of an initial turning operation in a lathe can be subjected to various other machining operations while held in the chuck with which it was turned, to ensure extraordinary accuracy in the performance of such other operations, while at the same time drastically reducing labor and set up time in preparing the workpiece for the subsequent machining operations. The invention involved the use of a simple and inexpensive adapter, and a procedure which is unique in the machining art, as will be explained.

Objects of the invention are to provide a simple and inexpensive adapter for use with lathe chucks and degree plates of known design, for effecting substantial savings in time and labor incident to various machining operations upon turned workpieces, or workpieces centered in a lathe chuck; to provide a novel method of handling and setting up such workpieces for machining subsequently to turning; and to increase the accuracy with which machining operations are performed upon the workpiece subsequently to a turning operation, without producing throw-outs or imperfect workpieces in any stage of the procedure.

Other objects are to expedite and facilitate the machining of workpieces so as to reduce manufacturing costs, and to relieve the machinist of duties which produce fatigue and frustration in the effort to obtain accuracy of workmanship.

The foregoing and other objects are attained by the means described herein and illustrated upon the accompanying drawings, in which:

FIG. 3 is a fragmentary perspective view of a lathe equipped as in FIG. 2, showing the chuck with the workpiece therein mounted upon the milling attachment by way of the degree plate and the adapter of the invention, the workpiece being thereby set up for drilling in parallelism with the workpiece axis of rotation.

2

Figure 1:
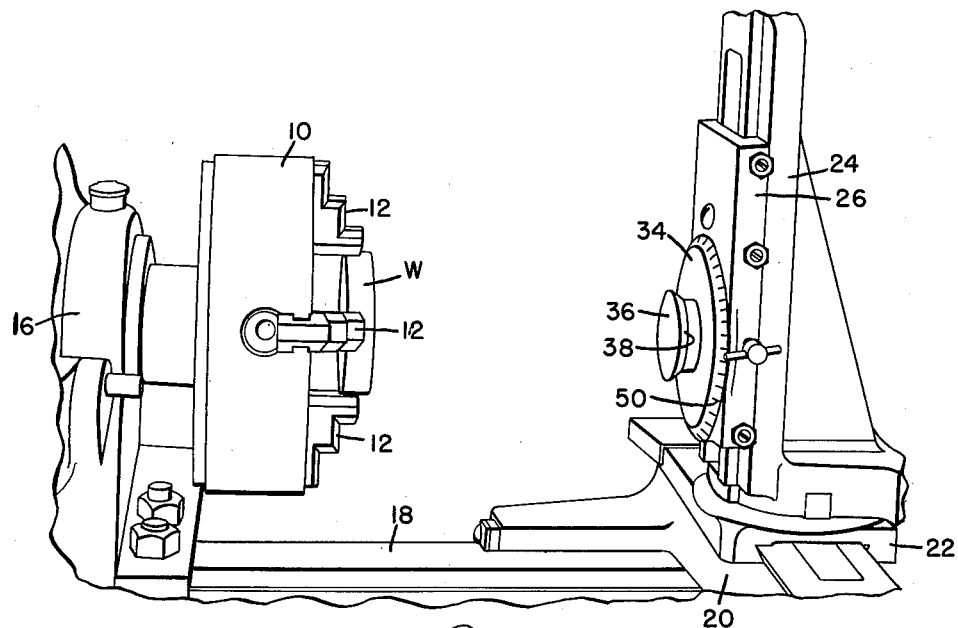
FIG. 1 is a fragmentary perspective view of a typical lathe the chuck of which holds a workpiece that has been turned, or otherwise centered in the chuck jaws, the view showing also a typical milling attachment mounted upon the carriage cross-slide, and carrying a degree plate of common design.
Figure 2:
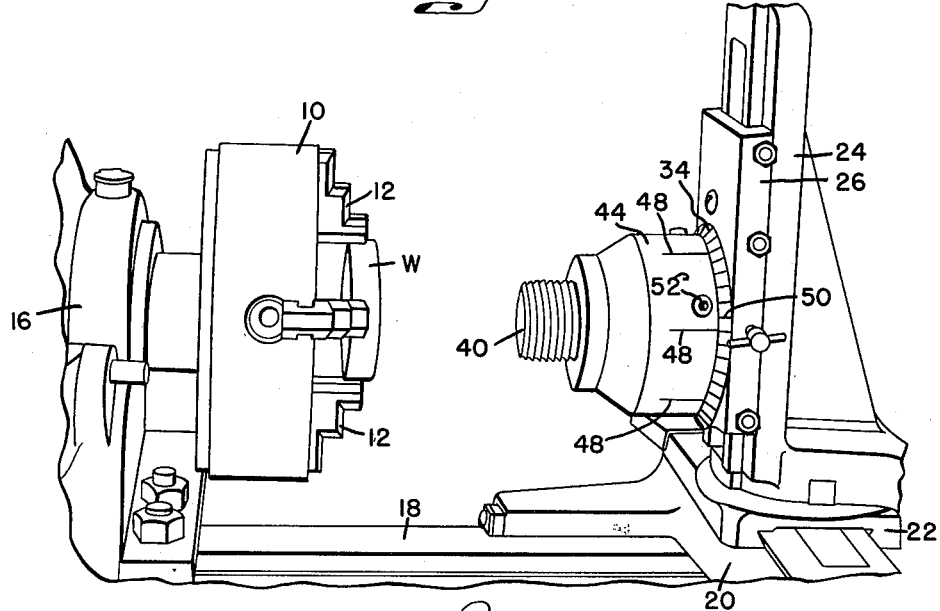
FIG. 2 is a view similar to FIG. 1, showing the adapter of the invention applied to the center button of the degree plate, preparatory to mounting of the lathe chuck, with the workpiece intact therein, upon the adapter.

FIG. 4 is a fragmentary side elevational view showing the adapter partly in cross-section, or applied to the button of a degree plate supported upon the milling attachment.

FIG. 5 is a cross-sectional view taken on line 5—5 of FIG. 4.

FIG. 6 is a fragmentary top plan view of a lathe the cross-slide of which supports a workpiece in position for milling according to the method of the present invention.

FIG. 7 is a perspective view of a conventional drill press upon which the chuck-supported workpiece may be mounted according to the method of the present invention.

FIG. 8 is a fragmentary perspective view showing the chuck-supported workpiece mounted upon the drill press in alternative manner, using the manner of the invention herein disclosed.

In all of the drawing views, W indicates a representative workpiece which may be in the form of a cylindrical thick disc as shown, held in concentricity with a lathe chuck 10 by means of the usual jaws 12. The chuck is applied in customary manner upon the threaded live center 14 of the lathe headstock 16, and may be readily disassociated from the live center of unscrewing it therefrom, without releasing the workpiece from the chuck jaws. Upon bodily removal of the chuck from the live center, the turned workpeice W will remain exactly centered in the chuck, as will be understood.

In those views which show a lathe, the bed is indicated at 18 and the carriage is indicated at 20, the latter being provided with the customary cross-slide 22 adapted to carry various tools and fixtures. One such fixture may be a milling attachment of ordinary design, indicated generally by the character 24. The milling attachment as usual may have a swivel mounting upon the carriage cross-slide, and includes a vertically adjustable slide member 26 movable to desired elevations by means including a feed screw 28, FIGS. 3 and 6. In FIG. 6 is shown also the cross-slide screw 30 whereby the milling attachment may be moved bodily crosswise of the lathe bed, carrying with it the chuck 10 and workpiece W. Movements thereof lengthwise of the lathe bed are effected by means of the carriage traverse wheel 32.

The slide member 26 of the milling attachment may be furnished with a degree plate 34, FIG. 1, which is stationarily secured thereto in flatwise contact, and which includes a laterally extending button 36. The head of the button may be flared outwardly to provide a conical portion or step 38 of lesser diameter than the terminal end of the button. The button is fixed in relation to the degree plate, and is concentric therewith.

The adapter with which the present invention is concerned, is made to clamp upon the button 36 in exact concentricity, and presents an extending concentric stud 40 to support the lathe chuck 10 and the workpiece held thereby. Stud 40 preferably is externally screw-threaded in correspondency with the thread of live-center 14, so that the complementarily threaded chuck hub may be screw-connected to stud 40, with the back or rear face of the chuck abutting the planar forward face 42 of the adapter body 44. When the chuck with the workpiece intact is unscrewed from the live center of the lathe, and then screwed onto the adapter stud as in FIG. 3, the turned workpiece will be as truly centered relative to the stud as it was to the live center of the lathe. Accordingly, the workpiece may be presented to a drill 45, FIG. 3, with assurance that every drill hole 46 produced in the face of the workpiece will be accurately and uniformly spaced from the peripheral edge, or from the center point, of the workpiece, without resort to tedious and painstaking measurements.

It may here be noted that the body 44 of the adapter is desirably provided with indexing marks or scale lines 48 to co-operate with the degree marks or calibrations 50 of the degree plate 34, enabling the operator to rotate the adapter and the chuck-supported workpiece with great accuracy and facility, in presenting the workpiece to the drill 45 for predetermined spacing of holes to be drilled. Tools other than the drill 45 may be applied to the live center of the lathe headstock, if desired, depending upon the nature of the operation to be performed upon the workpiece. As is obvious, the elevation of the workpiece relative to a tool 45 may be quickly and easily adjusted by manipulating the vertical screw 28, and with equal dispatch the workpiece may be adjusted laterally by means of the cross-slide screw 30.

Means are provided for clamping the adapter body 44 to the stationary degree plate button 36 while the workpiece is being operated upon by the drill or other tool 45. Such means may be in the form of socket-headed set-screws 52 threaded into radial bores 54 of the adapter body and arranged to forcefully project against the button head 36 the shoes or pins 56, which are loosely supported in the bores 54. The inner ends 58 of the shoes may be inclined as shown, to obtain maximum surface contact upon the button inclination 38. When the screws are tightened against the shoes, the annular base 60 of the adapter body is forcefully pressed against the degree plate to lock the adapter against rotation relative thereto. Whenever the adapter is to be rotated for spotting the workpiece to the tool 45, it is necessary only to loosen the screws 52 to release the adapter for rotation. Any number of locking screws and cooperating shoes or pins 56 may be provided, as needed. The axial bore or socket 62 provided in the base of the adapter should be accurately dimensioned to snugly though removably accommodate the button 36 with minimum peripheral clearance. Bore 62 is to be accurately aligned with the stud 40, on a common axis.

It is to be understood that the screws 52 might directly impinge against button 36, without the intermediary of pins or shoes such as 56; however, the construction shown is preferable as a clamping means, although within the scope of the appended claim such clamping means may be subject to various modifications.

Whereas in FIG. 3 the workpiece W is shown positioned for drilling for a circular row of holes axially of the workpiece, the milling attachment 24 might be bodily rotated ninety degrees upon the cross-slide as in FIG. 6, to present the periphery of the workpiece to the drill 45 for the drilling of holes radially of the workpiece; or as FIG. 6 indicates, the drill might be replaced by a milling cutter or similar tool 64 to operate upon the workpiece W. By means of the various adjustments upon the carriage and milling attachment, the workpiece may be presented to the tool in a variety of machining positions.

FIGS. 7 and 8 indicate suggested applications of the invention to a drill press. In FIG. 7, the degree plate 34 is bolted or otherwise secured to the work table 66 of the press, with the adapter 44 standing upright to support the chuck 10 in horizontal position. If the workpiece W is to be provided with a circular arrangement of holes as in FIG. 3, the entire assembly including the workpiece will be supported upon table 66 in offset relationship to tool 45, so as to properly spot the tool for drilling of the first hole. Once the first hole has been drilled, others may be spotted and drilled marginally of the workpiece by merely loosening the screws 52 and rotating the adapter, the chuck, and the workpiece as a unit, relative to the drill point. During the drilling operation the screws 52 will preferably be tightened to clamp the unitary assembly to the degree plate, which is in turn fixed to table 66. Accurate spacing of the drilled holes may be accomplished with ease and dispatch, using the calibrations 48 and 50.

In the example of FIG. 8, the workpiece W is held in position upon table 66, for the drilling of holes 46 radially in the edge face of the workpiece. Here, the chuck and workpiece are applied to the adapter 44 as previously explained, and the degree plate 34 is provided with a squared stud 68 to be clamped in a vise 70 fixed to table 66. As in the examples previously described, the clamp screws 52 may be loosened to permit rotation of the chuck and the workpiece held thereby, for presenting different points on the workpiece edge to the tool 45. Angularity of the drilled holes may be determined by changing the angle at which the squared stud 68 projects from the vise 70, and spacing of the holes relatively is quickly and accurately accomplished with the aid of the calibrations applied to the degree plate and the adapter body.

From the foregoing explanation it will be at once evident that the present invention expedites and facilitates certain machine operations which heretofore demanded much painstaking and time-consuming effort on the part of the machinist. Moreover, accuracy of fabrication is greatly improved, and the production of throw-outs or imperfect workpieces is reduced to a practical minimum. Other advantages resulting from use of the present invention have been recited hereinbefore, and are worthy of note.

It is to be understood that various modifications and changes in structural details of the invention may be resorted to, within the scope of the appended claim, without departing from the spirit of the invention.

What I claim is:

An adapter for the outwardly divergent annular side walls of the button which projects forwardly from the planar front face of a degree plate; said adapter comprising a one-piece cylindrical body portion having laterally spaced front and rear faces normal to the longitudinal axis of said cylindrical portion, a right cylindrical axial bore in the rear face of said body to receive a degree plate button with close lateral tolerance, a radial bore adjacent the rear face of said body in open communication with said axial bore, a shoe slidably mounted in said radial bore, said shoe including an end engageable with the divergent side walls of a degree plate button housed within said axial bore, means associated with said radial bore and engaging said shoe to impart endwise movement to said shoe and maintain it in advanced position relative to said radial bore and in positive contact with the divergent side walls of a degree plate button within said axial bore for imparting axial movement to said adapter toward the degree plate and forcing the rear face of the adapter against and in frictional contact with the front face of the degree plate for securely though releasably locking said adapter relative thereto, and an externally threaded stud integral with and projecting from the front face of the adapter and in axial alignment with the aforesaid axial bore.

References Cited in the file of this patent

UNITED STATES PATENTS

| | | |
|---|---|---|
| 359,379 | Ballou | Mar. 15, 1887 |
| 704,440 | Croker | July 8, 1902 |
| 1,691,320 | Whitcomb | Nov. 13, 1928 |
| 2,203,162 | Lee | June 4, 1940 |
| 2,315,393 | Bowerman | Mar. 30, 1943 |
| 2,362,873 | Wessman | Nov. 14, 1944 |
| 2,371,435 | Galorneau | Mar. 13, 1945 |
| 2,394,175 | Hill | Feb. 5, 1946 |
| 2,521,231 | Larson | Sept. 5, 1950 |
| 2,608,909 | Quinn | Sept. 2, 1952 |
| 2,775,026 | Schrader | Dec. 25, 1956 |
| 2,828,536 | Kaiser | Apr. 1, 1958 |

FOREIGN PATENTS

| | | |
|---|---|---|
| 626,563 | Germany | Feb. 28, 1936 |